United States Patent [19]

Staendeke et al.

[11] Patent Number: 4,853,288
[45] Date of Patent: Aug. 1, 1989

[54] STABILIZED RED PHOSPHORUS AND PROCESS FOR MAKING IT

[75] Inventors: Horst Staendeke, Lohmar; Ursus Thümmler, Erftstadt; Wilhelm Adam, Neu-Isenburg, all of Fed. Rep. of Germany

[73] Assignee: Hoechst Aktiengesellschaft, Frankfurt am Main, Fed. Rep. of Germany

[21] Appl. No.: 166,107

[22] Filed: Mar. 10, 1988

[30] Foreign Application Priority Data

Mar. 27, 1987 [DE] Fed. Rep. of Germany ....... 3710170

[51] Int. Cl.⁴ ..................... C01B 25/01; C01B 25/023
[52] U.S. Cl. ................... 428/402.24; 423/274; 423/322
[58] Field of Search ............... 423/274, 322; 428/402.24

[56] References Cited

U.S. PATENT DOCUMENTS

| | | | |
|---|---|---|---|
| 2,359,243 | 9/1944 | Pernert | 423/300 |
| 2,635,953 | 4/1953 | Silverstein et al. | 423/300 |
| 4,098,872 | 7/1978 | Staendeke et al. | 423/300 |
| 4,113,841 | 9/1978 | Staendeke et al. | 423/300 |
| 4,115,522 | 9/1978 | Staendeke et al. | 423/300 |
| 4,136,154 | 1/1979 | Staendeke et al. | 423/300 |
| 4,188,313 | 2/1980 | Cerny et al. | 423/300 |
| 4,210,630 | 7/1980 | Dany et al. | 423/300 |
| 4,315,897 | 2/1982 | Staendeke et al. | 423/300 |
| 4,489,183 | 12/1984 | Twardowska | 423/322 |
| 4,525,520 | 6/1985 | Shlol et al. | 428/402.24 |
| 4,698,215 | 10/1987 | Albanesi et al. | 423/322 |

FOREIGN PATENT DOCUMENTS

| | | | |
|---|---|---|---|
| 2622296 | 12/1977 | Fed. Rep. of Germany | 423/322 |
| 2646835 | 4/1978 | Fed. Rep. of Germany | . |
| 2655739 | 4/1978 | Fed. Rep. of Germany | 423/322 |
| 105996 | 9/1976 | Japan | 423/322 |
| 1545716 | 5/1979 | United Kingdom | 423/300 |

Primary Examiner—Robert L. Stoll
Assistant Examiner—Wayne A. Langel

[57] ABSTRACT

Stabilized pulverulent red phosphorus consisting substantially of particles with a size of at most 2 mm, encapsulated in a thin layer of an oxidation stabilizer consisting of at least one scarcely water-soluble or water-insoluble metal hydroxide and a melamine/formaldehyde-polycondensation product.

8 Claims, No Drawings

STABILIZED RED PHOSPHORUS AND PROCESS FOR MAKING IT

The present invention relates to stabilized, pulverulent flowable red phosphorus consisting substantially of particles with a size of at most 2 mm, and to a process for making it.

As is known, red phosphorus is obtained by subjecting yellow phosphorus to a thermal conversion reaction so as to obtain the stabler red modification. After termination of the reaction, the crude red phosphorus containing about 0.5 to 1.5 wgt % yellow phosphorus is a compact mass. It is ground under inert gas and freed from yellow phosphorus in aqueous suspension by boiling it with a dilute sodium hydroxide solution (cf. Ullmanns Enzyclopädie der technischen Chemie, 3rd edition, vol. 13, 1962, Phosphorus, pages 517/518, published by Verlag Urban und Schwarzenberg, München/Berlin). More recently however the conversion is effected in a rotating reactor and the red phosphorus is obtained as a pulverulent mass. An aqueous suspension of red phosphorus is taken from the reactor (cf. European Specification 00 15 384), heated with steam in a stirring vessel and freed from about 0.1 wgt % residual yellow phosphorus by admixing it portionwise with sodium hydroxide solution.

Red phosphorus is used for pyrotechnical purposes, for making striking surfaces for matches, and also as an agent imparting flame-retardent properties to plastics materials, e.g. polyamides or polyurethanes.

In a moist atmosphere however, red phosphorus is known at its surface to undergo a chemical reaction during which various acids of phosphorus of oxidation stages $+1$ to $+5$ and hydrogen phosphide are formed by oxidation and disproportionation reactions.

It is therefore highly desirable to improve the unsatisfactory stability to oxidation of red phosphorus by stabilizing it.

The term "stabilization" as used herein denotes an operation during which the red phosphorus is given an improved protection against atmospheric influences and which contributes to reducing the formation of oxoacids of phosphorus and hydrogen phosphide during storage or processing, for example.

It has already been suggested that red phosphorus should be stabilized by means of aluminum hydroxide (cf. Gmelins Handbuch der anorganischen Chemie, 8th edition, 1964, volume Phosphorus, part B, page 83, published by Verlag Chemie, Weinheim/Bergstrasse, Federal Republic of Germany). By the subsequent addition of 10% solutions of sodium hydrogen carbonate and aluminum sulfate heated to 55°-60° C., thue aluminum hydroxide is precipitated on the phosphorus particles. Next, the aqueous suspension is filtered and the filter residue is dried. This process is beset with the disadvantage that undesirably large quantities of aluminum hydroxide are required to be used for producing a satisfactory stabilizing effect. In other words, the phosphorus becomes contaminated to an unacceptable extent considering the widespread uses it finds in the most various fields.

Another proces for stabilizing red phosphorus (U.S. Pat. No. 2,359,243) provides for the red phosphorus to be suspended in an aqueous 0.04 N solution of sodium aluminate, for air to be passed through the suspension over a period of 10 hours at 85° to 90° C., for the whole to be filtered, washed with hot water and dried under vacuum.

Apart from aluminum hydroxide, zinc or magnesium hydroxide can be used for stabilizing red phosphorus (cf. U.S. Pat. No. 2,635,935).

In German Specification DE-OS No. 28 13 151, it has finally been suggested that red phosphorus should be stabilized using a blend of aluminum hydroxide and lead hydroxide.

These known processes do not permit red phosphorus to be satisfactorily stabilized to oxidation using a minimum of stabilizer. In fact, the oxidation stabilizers described heretofore present an unsatisfactory thermal stability, and water is split off at elevated temperatures. With respect to plastics which are to be processed on an extruder and have red phosphorus as a flame-proofing agent incorporated therein, which in turn contains an oxidation stabilizer, it is generally accepted that the oxidation stabilizer should be thermally stable but fail to split off water or decompose, even at temperatures above 300° C.

This is a disadvantageous effect which has also been encountered in the stabilization process described in German Offenlegungsschrift No. 2,622,296. In that process, the stabilizing effect is achieved by precipitating small amounts of metal salts of various acid orthophosphoric acid esters on to the surface of the red phosphorus.

The orthophosphoric acid metal salts suggested for use as stabilizers in German Offenlegungsschrift No. 2 631 532, produce material which has a stability to oxidation inadequate for a variety of uses.

The metal salts of phosphonic acids and phosphinic acids (cf. German Offenlegungsschrift No. 2 647 093 and German Offenlegungsschrift No. 2 632 296 respectively) admittedly produce good thermal stability and oxidation stability, but they are relatively expensive products and have to be used in proportions as high as about 3–5 wgt %.

As described in German Patent Specificaiton DE-PS No. 2 655 739 and German Offenlegungsschrift DE-OS No. 2 705 042, it is possible for the stability to oxidation of red phosphorus to be effectively improved by applying a thin layer of a melamine/formaldehyde resin to the surface of the red phosphorus particles. These stabilizers were however found to be unsatisfactory inasmuch as the stabilizing effect is largely lost if the stabilized phosphorus is stored under tropical conditions, i.e. at 50° C. and 100% relative atmospheric moisture, as simulated by a moisture/warm storage test.

German Patent Specification DE-PS No. 2 625 674 discloses an agent which permits red phosphorus to be used in plastics, without the risk that hydrogen phosphide is liable to be liberated at the temperature selected for processing the plastic or under the action of the small amounts of water or moisture contained in the plastic to be processed. The agent comprises epoxide resins, which encapsulate the phosphorus particles, the resins being used in proportions of 5–50 wgt %.

Finally, German Specification DE-PS No. 29 45 118 discloses stabilized, pulverulent red phosphorus, consisting of phosphorus particles having a particle size of at most about 2 mm, and an oxidation stabilizer encapsulating the phosphorus particles in the form of a thin layer, the oxidation stabilizer comprising an epoxide resin and aluminum hydroxide.

We have now found that the stability to oxidation of red phosphorus stabilized by encapsulating it in a melamine/formaldehyde resin blend as disclosed in German Specifications DE-PS No. 26 55 739 and DE-OS No. 27 05 042, can unexpectedly be further improved in distinct fashion by using a metal hydroxide as a co-stabilizer (cf. Table 2, Examples 10 to 13).

The present invention relates more particularly to stabilized pulverulent red phosphorus, the individual particles of which have a size of at most 2 mm and are encapsulated in a thin layer of an oxidation stabilizer, the oxidation stabilizer comprising at least one metal hydroxide being scarcely water-soluble or water-insoluble and a polycondensation product of melamine and formaldehyde. The oxidation stabilizer is used in a total quantity of 1.1 to 25 weight %, based on the quantity of red phosphorus. More especially the metal hydroxide should be used in a quantity of 0.1 to 5 weight % and the melamine/formaldehyde resin in a quantity of 1 to 20 weight % the percentages being based on the quantity of red phosphorus.

The metal hydroxides used in accordance with this invention are preferably the hydroxides of aluminium, silicon, titanium, zinc, chromium, manganese, germanium, zirconium, niobium, cadmium, tin, lead, bismuth and/or cerium.

The process for making the stabilized pulverulent red phosphorus comprises: admixing an aqueous suspension of the red phosphorus with a water-soluble metal salt; establishing a pH of 4–9 which is selected depending on the conditions optimal for precipitating the respective metal hydroxide; adding an aqueous solution of a preliminary condensation product of melamine and formaldehyde; intimately mixing the whole and reacting it over a period of 0.5 to 3 hours at a temperature of 40° to 100° C.; allowing the preliminary condensation product to harden; and ultimately filtering the phosphorus particles and drying them at elevated temperature.

It is advantageous for the phosphorus particles to be ultimately dried at a temperature of 80° to 120° C. in a stream of nitrogen.

The preliminary condensation product should conveniently contain melamine and formaldehyde in a molar ratio of or between 1:1 to 1:6, preferably 1:1.2 to 1:1.8.

The process of this invention was carried out using the following commercially available products:

1. ®MADURIT MW 815, a registered Trade Mark of Cassella Aktiengesellschaft, Frankfurt/Main, Federal Republic of Germany;

2. ®MADURIT MW 909, a registred Trade Mark of Cassella Aktiengesellschaft, Frankfurt/Main, Federal Republic of Germany;

3. ®MADURIT-hardener VMH 3843, a registered Trade Mark of Cassella Aktiengesellschaft.

The product referrred to udner (1) above is a partially etherified melamine/formaldehyde-resin which is obtainable as a 75% aqueous solution that has a dynamic viscosity of 300–500 mPa.s (at 23° C.), a pH-value of 8.2–9.2 (at 23° C.) and a density of 1.20–1.25 g/ml (at 23° C.).

The uncured melamine/formaldehyde-resin referred to under (2) above is a powder, the 50% aqueous solution of which has a dynamic viscosity of about 30 mPa.s (at 20° C.), a pH-value of 9–10 (at 20° C.) and a density of 1.21–1.23 g/ml (at 20° C.).

The agent accelerating the hardening referred to under (3) above is an aqueous amine solution, which has a pH of 6.2–7.0 (at 20° C.), a density of 1.16–1.17 g/ml (at 20° C.), and a refractive index of 1.392–1.400 (at 25° C.).

The following Examples and Tables illustrate the invention which is naturally not limited thereto:

DETERMINING STABILITY TO OXIDATION

The stability to oxidation was determined in a moisture/warm storage test.

To this end, 5.0 g red phosphorus was weighed into a crystallizing dish 50 mm wide and the dish was stored in a closed glass vessel over a period of 168 hours at 50° C. and 100% relative atmospheric moisture. The hydrogen phosphide formed was either expelled from the glass vessel by means of a stream of air (10 1/h) and reacted in a gas scrubbing bottled with a 2.5 weight % solution of mercury(II)chloride and the quantity of hydrochloric acid obtained was determined by titration or determined using a DRÄGER tube "Phosphorwasserstoff 50/a" (=hydrogen phosphide).

In order to determine the various oxo acids of phosphorus, the phosphorus specimen was given into a 250 ml beaker, admixed with 200 ml hydrochloric acid of 1% strength, heated to boiling for 10 minutes and filtered. Next, the acid-soluble phosphorus was determined in the filtrate by the photometric molybdato-vanadato-phosphoric acid-method.

In order to determine the quantity of acid-soluble phosphorus initially present, the red phosphorus was subjected to the analytic process just described without prior moisture/warm storage test. The value so obtained was deduced from that determined for the content of acid-soluble phosphorus after the moisture/warm storage test.

EXAMPLE 1 (COMPARATIVE EXAMPLE)

500 ml of an aqueous phosphorus suspension containing 250 g red phosphorus was diluted with 250 ml water in a 2 liter-stirring reactor of glass, and heated to 60° C. Next, 2.0 g aluminum hydroxide was dissolved in 20 ml of a 50% sodium hydroxide solution, and added to the suspension of red phosphorus. Sulfuric acid of 5% strength was added and a pH and 8 established; the suspension was then stirred for 1 hour at 60° C.

After filtration, the filter residue was washed with water and dried at 100° C. in a stream of nitrogen. The product was analyzed and found to contain 0.79% aluminum hydroxide.

The values determined for the stability to oxidation are indicated in Table 1.

EXAMPLE 2 (COMPARATIVE EXAMPLE)

The procedure was as in Example 1, but 3.0 g aluminum hydroxide was used. The product was analyzed and found to contain 1.18% aluminum hydroxide.

The values determined for the stability to oxidation are indicated in Table 1.

EXAMPLE 3 (COMPARATIVE EXAMPLE)

The procedure was as in Example 1, but 5.0 g aluminum hydroxide was used. The product was analyzed and found to contain 1.94% aluminum hydroxide.

The values determined for the stability to oxidation are indicated in Table 1.

EXAMPLE 4 (COMPARATIVE EXAMPLE)

500 ml of an aqueous phosphorus suspension containing 250 g red phosphorus was diluted in a 2-liter stirring reactor of glass with 500 ml water and heated to 60° C. Next, phosphoric acid of 5% strength was added and a pH of 5 was established; 35 g ®MADURIT MW 815 was added and the pH of 5 re-established. After a stirring period of 1 h at a temperature of 60° C., the suspension was filtered. The filter residue was water-washed and dried at 100° C. in a stream of nitrogen.

The red phosphorus so treated was found to contain 6.1% melamine/formaldehyde-resin, corresponding to a resin yield of 58%.

The values determined for the stability to oxidation are indicated in Table 1.

EXAMPLE 5 (COMPARATIVE EXAMPLE)

The procedure was as in Example 4, but 75 g ®MADURIT MW 815 was used. The red phosphorus was found to contain 13.7% melamine/formaldehyde-resin, corresponding to a resin yield of 61%.

The values determined for the stability to oxidation are indicated in Table 1.

EXAMPLE 6 (COMPARATIVE EXAMPLE)

The procedure was as in Example 4, but 18 g ®MADURIT MW 909 was used. The red phosphorus was found to contain 5.3% melamine/formaldehyde-resin, corresponding to a resin yield of 75%.

The values determined for the stability to oxidation are indicated in Table 1.

EXAMPLE 7 (COMPARATIVE EXAMPLE)

The procedure was as in Example 4, but 38 g ®MADURIT MW 909 was used.

The red phosphorus was found to contain 10.7% melamine/formaldehyde-resin, corresponding to a resin yield of 71%.

The values determined for the stability to oxidation are indicated in Table 1.

EXAMPLE 8 (INVENTION)

500 ml of an aqueous phosphorus suspension containing 250 g red phosphorus was diluted in a 2-liter stirring reactor of glass with 250 ml water and heated to 60° C. Next, a solution of 12.5 g aluminum sulfate (Al$_2$(SO$_4$)$_3$·18H$_2$O) in 100 ml water was added; next, sodium hydroxide solution of 5% strength was added and a pH of 5 was established. 31 g ®MADURIT MW 815 was then added dropwise. After a reaction period of 2 h at 60° C., the whole was filtered. The filter residue was water-washed and dried at 100° C. in a stream of nitrogen.

The product so obtained was analyzed and found to contain 1.16% aluminum hydroxide and 7.2% melamine/formaldehyde-resin, corresponding to a resin yield of 77%.

The values determined for the stability to oxidation are indicated in Table 1.

EXAMPLE 9 (INVENTION)

The procedure was as in Example 8, but 16.5 g aluminum sulfate and 45 g ®MADURIT MW 815 were used.

The product was analyzed and found to contain 1.53% aluminum hydroxide and 9.8% melamine/formaldehyde-resin, corresponding to a resin yield of 72%.

The values determined for the stability to oxidation are indicated in Table 1.

EXAMPLE 10 (INVENTION)

The procedure was as in Example 8, but 10.0 g aluminum sulfate and 27 g ®MADURIT MW 909 were used.

The product was analyzed and found to contain 0.94% aluminum hydroxide and 7.7% melamine/formaldehyde-resin, corresponding to a resin yield of 72%.

The values determined for the stability to oxidation are indicated in Table 1.

EXAMPLE 11 (INVENTION)

The procedure was as in Example 8, but 17.5 g aluminum sulfate and 35 g ®MADURIT MW 909 were used.

The product was analyzed and found to contain 1.63% aluminum hydroxide and 10.2% melamine/formaldehyde-resin, corresponding to a resin yield of 74%.

The values determined for the stability to oxidation are indicated in Table 1.

EXAMPLE 12 (COMPARATIVE EXAMPLE)

The procedure was as in Example 1, but 7.5 g zinc sulfate (ZnSO$_4$·7H$_2$O) in 100 ml water was used. The product was analyzed and found to contain 0.91% zinc hydroxide.

The values determined for the stability to oxidation are indicated in Table 2.

EXAMPLE 13 (COMPARATIVE EXAMPLE)

The procedure was as in Example 1, but 15 g zinc sulfate was used. The product was analyzed and found to contain 1.75% zinc hydroxide.

The values determined for the stability to oxidation are indicated in Table 2.

EXAMPLE 14 (COMPARATIVE EXAMPLE)

The procedure was as in Example 1, but 37.5 g zinc sulfate was used. The product was analyzed and found to contain 4.65% zinc hydroxide.

The values determined for the stability to oxidation are indicated in Table 2.

EXAMPLE 15 (INVENTION)

The procedure was as in Example 10, but 7.5 g zinc sulfate, 27 g ®MADURIT MW 909 and 5 g ®MADURIT hardener VMH 3843 were used. The metal hydroxides were precipitated, and the melamine/formaldehyde-resin condensed at a pH of 7 of the phosphorus suspension.

The product was analyzed and found to contain 0.96% zinc hydroxide and 8.7% melamine/formaldehyde-resin, corresponding to a resin yield of 81%.

The values determined for the stability to oxidation are indicated in Table 2.

EXAMPLE 16 (INVENTION)

The procedure was as in Example 15, but 15 g zinc sulfate was used. The product so made was analyzed and found to contain 1.92% zinc hydroxide and 9.3% melamine/formaldehyde-resin, corresponding to a resin yield of 83%.

The values determined for the stability to oxidation are indicated in Table 2.

EXAMPLE 17 (INVENTION)

The procedure was as in Example 15, but 7.5 g tin(II)-chloride was used.

The product was analyzed and found to contain 1.87% tin(II)hydroxide and 9.4% melamine/formaldehyde-resin, corresponding to a resin yield of 88%.

The values determined for the stability to oxidation are indicated in Table 3.

EXAMPLE 18 (INVENTION)

The procedure was as in Example 15, but 11 g tin(II)-chloride was used.

The product was analyzed and found to contain 2.73% tin(II)hydroxide and 9.1% melamine/formaldehyde-resin, corresponding to a resin yield of 89%.

The values determined for the stability to oxidation are indicated in Table 3.

EXAMPLE 19 (COMPARATIVE EXAMPLE)

The procedure was as in Example 1, but 9.0 g cerium-(III)nitrate, $Ce(NO_3)_3 \cdot 6\ H_2O$ was used.

The product was analyzed and found to contain 1.14% cerium(III)hydroxide.

The values determined for the stability to oxidation are indicated in Table 4.

EXAMPLE 20 (COMPARATIVE EXAMPLE)

The procedure was as in Example 1, but 21.3 g cerium(III)nitrate was used.

The product was analyzed and found to contain 2.36% cerium(III)hydroxide.

The values determined for the stability to oxidation are indicated in Table 4.

EXAMPLE 21 (INVENTION)

The procedure was as in Example 15, but 5.7 g cerium(III)nitrate and 34 g ®MADURIT MW 909 were used.

The metal hydroxides were precipitated and the melamine resin was condensed at a pH of 8 of the phosphorus suspension.

The product was analyzed and found to contain 1.02% cerium(III)hydroxide and 10.0% melamine/formaldehyde-resin, corresponding to a resin yield of 74%.

The values determined for the stability to oxidation are indicated in Table 4.

EXAMPLE 22 (INVENTION)

The procedure was as in Example 21, but 11.4 g cerium(III)nitrate was used.

The product was analyzed and found to contain 1.96% cerium(III)hydroxide and 9.7% melamine/formaldehyde-resin, corresponding to a resin yield of 76%.

The values determined for the stability to oxidation are indicated in Table 4.

EXAMPLE 23 (COMPARATIVE EXAMPLE)

The procedure was as in Example 1, but 5.0 g manganese(II)sulfate, $MnSO_4 \cdot H_2O$, was used.

The product was analyzed and found to contain 1.00% manganese(II)-hydroxide.

The values determined for the stability to oxidation are indicated in Table 5.

EXAMPLE 24 ((COMPARATIVE EXAMPLE)

The procedure was as in Example 1, but 25 g manganese(II)sulfate was used.

The product was analyzed and found to contain 4.75% manganese(II)hydroxide.

The values determined for the stability to oxidation are indicated in Table 5.

EXAMPLE 25 (INVENTION)

The procedure was as in Example 15, but 5 g manganese(II)sulfate and 35 g ®MADURIT MW 909 were used.

The metal hydroxides were precipitated and the melamine resin was condensed at a pH of 9 of the phosphorus suspension.

The product was analyzed and found to contain 0.94% manganese(II)hydroxide and 9.0% melamine/formaldehyde-resin, corresponding to a resin yield of 69%.

The values determined for the stability to oxidation are indicated in Table 5.

EXAMPLE 26 (INVENTION)

The procedure was as in Example 25, but 15 g manganese(II)sulfate was used.

The product was analyzed and found to contain 2.82% manganese(II)hydroxide and 8.9% melamine/formaldehyde-resin, corresponding to a resin yield of 71%.

The values determined for the stability to oxidation are indicated in Table 5.

EXAMPLE 27 (COMPARATIVE EXAMPLE)

The procedure was as in Example 1, but 20 g of a 45% sodium silicate solution was used.

The product was analyzed and found to contain 1.09% silicon hydroxide (calculated as $SiO_2$).

The values determined for the stability to oxidation are indicated in Table 6.

EXAMPLE 28 (COMPARATIVE EXAMPLE)

The procedure was as in Example 1, but 85 g of a 45% sodium silicate solution was used.

The product was analyzed and found to contain 4.03% silicon hydroxide (calculated as $SiO_2$).

The values determined for the stability to oxidation are indicated in Table 6.

EXAMPLE 29 (INVENTION)

The procedure was as in Example 15, but 20 g of a 45% sodium silicate solution was used.

The product was analyzed and found to contain 1.02% silicon hydroxide (calculated as $SiO_2$) and 8.6% melamine/formaldehyde-resin, corresponding to a resin yield of 80%.

The values determined for the stability to oxidation are indicated in Table 6.

EXAMPLE 30 (INVENTION)

The procedure was as in Example 15, but 50 g of a 45% sodium silicate solution was used.

The product was analyzed and found to contain 2.44% silicon hydroxide (calculated as $SiO_2$) and 8.2% melamine/formaldehyde-resin, corresponding to a resin yield of 75%.

The values determined for the stability to oxidation are indicated in Table 6.

TABLE 1

Determining stability to oxidation

| Example | Stabilizer Nature | Concentration (%) | Moisture/warm storage-test at 50° C. and 100% rel. atmospheric moisture over 7 day-period | |
|---|---|---|---|---|
| | | | mg $PH_3$/g · day | mg P/g · day[2] |
| 1 Comp. | Al(OH)$_3$ | 0.79 | 0.41 | 8.77 |
| 2 Comp. | Al(OH)$_3$ | 1.18 | 0.33 | 7.41 |
| 3 Comp. | Al(OH)$_3$ | 1.94 | 0.27 | 5.25 |
| 4 Comp.[1] | ® MADURIT MW 815 | 6.1 | 0.063 | 3.53 |
| 5 Comp.[1] | ® MADURIT MW 815 | 13.7 | 0.042 | 3.27 |
| 6 Comp.[1] | ® MADURIT MW 909 | 5.3 | 0.050 | 3.16 |
| 7 Comp.[1] | ® MADURIT MW 909 | 10.7 | 0.039 | 2.74 |
| 8 invention | Al(OH)$_3$ | 1.16 | 0.017 | 1.48 |
| | ® MADURIT MW 815 | 7.2 | | |
| 9 invention | Al(OH)$_3$ | 1.53 | 0.011 | 0.97 |
| | ® MADURIT MW 815 | 9.8 | | |
| 10 invention | Al(OH)$_3$ | 0.94 | 0.021 | 1.32 |
| | ® MADURIT MW 909 | 7.7 | | |
| 11 invention | Al(OH)$_3$ | 1.63 | 0.01 | 0.82 |
| | ® MADURIT MW 909 | 10.20 | | |

[1]Stabilized as disclosed in Example 6 of DE-PS 26 55 739
[2]The increase in acid-soluble phosphorus was determined.

TABLE 2

Determining stability to oxidation

| Example | Stabilizer Nature | Concentration (%) | Moisture/warm storage at 50° C. and 100% rel. atmospheric moisture | |
|---|---|---|---|---|
| | | | mg $PH_3$/g · day | mg P/g · day |
| 12 Comp. | Zn(OH)$_2$ | 0.91 | 0.37 | 8.84 |
| 13 Comp. | Zn(OH)$_2$ | 1.75 | 0.32 | 7.20 |
| 14 Comp. | Zn(OH)$_2$ | 4.65 | 0.21 | 3.34 |
| 6 Comp. | ® MADURIT MW 909 | 5.3 | 0.050 | 3.16 |
| 7 Comp. | ® MADURIT MW 909 | 10.7 | 0.039 | 2.74 |
| 15 Invention | Zn(OH)$_2$ | 0.96 | 0.005 | 0.37 |
| | ® MADURIT MW 909 | 8.7 | | |
| 16 Invention | Zn(OH)$_2$ | 1.92 | 0.001 | 0.11 |
| | ® MADURIT MW 909 | 9.3 | | |

[1]The increase in acid-soluble phosphorus was determined.

TABLE 3

Determining stability to oxidation

| Example | Stabilizer Nature | Concentration (%) | Moisture/warm storage at 50° C. and 100° C. rel. atmospheric moisture | |
|---|---|---|---|---|
| | | | mg $PH_3$/g · day | mg P/g · day[1] |
| 6 (Comp.) | ® MADURIT MW 909 | 5.3 | 0.050 | 3.16 |
| 7 (Comp.) | ® MADURIT MW 909 | 10.7 | 0.039 | 2.74 |
| 17 (Invention) | Sn(OH)$_2$ | 1.87 | 0.013 | 0.30 |
| | ® MADURIT MW 909 | 9.3 | | |
| 18 (Invention) | Sn(OH)$_2$ | 2.73 | 0.015 | 0.10 |
| | ® MADURIT MW 909 | 9.1 | | |

[1]The increase of acid-soluble phosphorus was determined

TABLE 4

Determining stability to oxidation

| Example | Stabilizer Nature | Concentration (%) | Moisture/warm storage at 50° C. and 100° C. rel. atmospheric moisture | |
|---|---|---|---|---|
| | | | mg $PH_3$/ g · day | mg P/g · day[1] |
| 19 (Comp.) | Ce(OH)$_3$ | 1.14 | 0.29 | 1.21 |
| 20 (Comp.) | Ce(OH)$_3$ | 2.36 | 0.16 | 1.18 |
| 6 (Invention) | ® MADURIT MW 909 | 5.3 | 0.050 | 3.16 |
| 7 (Invention) | ® MADURIT MW 909 | 10.7 | 0.039 | 2.74 |
| 21 (Invention) | Ce(OH)$_3$ | 1.02 | 0.008 | 0.62 |
| | ® MADURIT MW 909 | 10.0 | | |
| 22 (Invention) | Ce(OH)$_3$ | 1.96 | 0.003 | 0.33 |
| | ® MADURIT MW 909 | 9.7 | | |

[1]The increase of acid-soluble phosphorus was determined

TABLE 5

| | Stabilizer | | Moisture/warm storage at 50° C. and 100° C. rel. atmospheric moisture | |
|---|---|---|---|---|
| Example | Nature | Concentration (%) | mg $PH_3$/g · day | mg P/g · day[1] |
| 23 (Comp.) | $Mn(OH)_2$ | 1.00 | 0.86 | 11.5 |
| 24 (Comp.) | $Mn(OH)_2$ | 4.75 | 0.13 | 3.09 |
| 6 (Comp.) | ® MADURIT MW 909 | 5.3 | 0.050 | 3.16 |
| 7 (Comp.) | ® MADURIT MW 909 | 10.7 | 0.039 | 2.74 |
| 25 (Invention) | $Mn(OH)_2$ | 0.94 | 0.005 | 0.23 |
| | ® MADURIT MW 909 | 9.0 | | |
| 26 (Invention) | $Mn(OH)_2$ | 2.82 | 0.007 | 0.35 |
| | ® MADURIT MW 909 | 8.9 | | |

[1]The increase of acid-soluble phosphorus was determined

TABLE 6

| | Stabilizer | | Moisture/warm storage at 50° C. and 100° C. rel. atmospheric moisture | |
|---|---|---|---|---|
| Example | Nature | Concentration (%) | mg $PH_3$/g · day | mg P/g · day[1] |
| 27 (Comp.) | $SiO_2 \cdot H_2O$ | 1.09 | 0.81 | 10.9 |
| 28 (Comp.) | $SiO_2 \cdot H_2O$ | 4.03 | 0.78 | 9.76 |
| 6 (Comp.) | ® MADURIT MW 909 | 5.3 | 0.050 | 3.16 |
| 7 (Comp.) | ® MADURIT MW 909 | 10.7 | 0.039 | 2.74 |
| 29 (Invention) | $SiO_2 \cdot H_2O$ | 1.02 | 0.012 | 0.31 |
| | ® MADURIT MW 909 | 8.6 | | |
| 30 (Invention) | $SiO_2 \cdot H_2O$ | 2.44 | 0.009 | 0.31 |
| | ® MADURIT MW 909 | 8.2 | | |

[1]The increase of acid-soluble phosphorus was determined

We claim:

1. Stabilized pulverulent red phosphorus, the individual particles of which have a size of at most 2 mm and are encapsulated in a thin layer of an oxidation stabilizer, the oxidation stabilizer comprising a polycondensation product of melamine and formaldehyde and at least one water-insoluble or sparingly water-soluble metal hydorxide selected from the group consisting of the hydroxides of aluminum, silicon, chromium, manganese, zinc, germanium, zirconium, niobium, cadmium, tin, lead, bismuth and cerium.

2. Stabilized red phosphorus as claimed in claim 1, containing the oxidation stabilizer in a total quantity of 1.1 to 25 weight-%, based on the quantity of red phosphorus.

3. Stabilized red phosphorus as claimed in claim 1, containing the metal hydroxide in a quantity of 0.1 to 5 weight % and the polycondensation product of melamine and formaldehyde in a quantity of 1 to 20 weight %, the percentages being based on the quantity of red phosphorus.

4. Stabilized red phosphorus as claimed in claim 1, wherein the polycondensation product of melamine and formaldehyde is obtained from a preliminary condensation product of melamine and formaldehyde.

5. Stabilized red phosphorus as claimed in claim 4, wherein said polycondensation product is obtained by establishing a pH of 4 to 9, adding the said preliminary condensation product in aqueous solution, heating the reaction mixture to a temperature of 40° to 100° C. for 0.5 to 3 hours, and allowing the said preliminary condensation product to harden.

6. Stabilized red phosphorus as claimed in claim 1, wherein a said metal hydroxide is a hydroxide selected from the group consisting of aluminum, zinc, tin, cerium, silicon, and manganese hydroxide.

7. A process for making the stabilized pulverulent red phosphorus as claimed in claim 1, which comprises: admixing an aqueous suspension of the red phosphorus with a water-soluble metal salt selected from the group consisting of salts of aluminum, silicon, chromium, manganese, zinc, germanium, zirconium, niobium, cadmium, tin, lead, bismuth and cerium; establishing a pH of 4 to 9; adding an aqueous solution of a preliminary condensation product of melamine and formaldehyde; intimately mixing the whole and reacting it over a period of 0.5 to 3 hours at a temperature of 40° to 100° C.; allowing the preliminary condensation product to harden; and ultimately filtering the phosphorus particles and drying them at elevated temperature.

8. A process as claimed in claim 7, wherein the phosphorus particles are ultimately dried at a temperature of 80° to 120° C. in a stream of nitrogen.

* * * * *